April 26, 1938. F. W. OFELDT 2,115,587

HEATER TANK ASSEMBLY

Filed July 18, 1936

INVENTOR.
Frank W. Ofeldt
BY Edward A. Lawrence
his ATTORNEY.

Patented Apr. 26, 1938

2,115,587

UNITED STATES PATENT OFFICE 2,115,587

HEATER TANK ASSEMBLY

Frank W. Ofeldt, McKeesport, Pa., assignor to Homestead Valve Manufacturing Company, Coraopolis, Pa., a corporation of Pennsylvania Application July 18, 1936, Serial No. 91,406

2 Claims. (Cl. 126—350)

This invention relates generally to tank structures for heating fluids.

An important characteristic of my invention is the provision of means for including in a common outer enclosure or tank a combustion chamber, a compartment for storing a supply of the fluid or fluids to be heated, and a fuel supply compartment.

Another characteristic is the provision of a compact and conveniently portable structure which may be advantageously employed for many purposes for which a heated liquid is required, as for instance in various cleansing and/or spraying operations.

Another characteristic of my invention is the provision of such a tank assembly which is arranged both for preheating the liquid to be heated by proximity to the combustion chamber, and for the heat-insulation of the supply of fuel by the interposition of the fluid to be heated between the fuel storage compartment and the combustion chamber.

Another characteristic is the provision of means for heat-insulating the upper end of the fuel compartment, preferably by extending the compartment for the liquid to be heated over the top of the fuel compartment.

Other objects and novel features of construction, and also of arrangement of parts, will appear from the following description.

In the accompanying drawing, wherein I have illustrated a practical embodiment of the principles of my invention:

Figure 1:
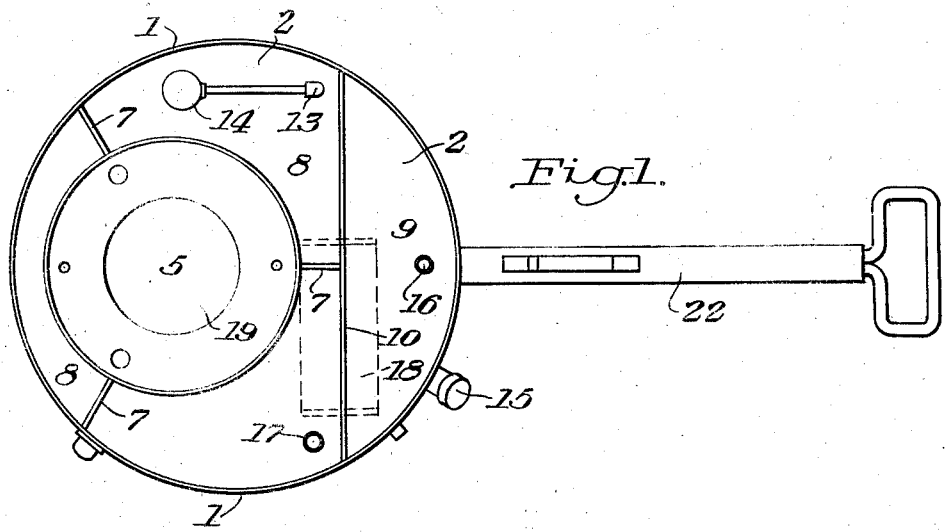
Fig. 1 is a plan view of a heater tank assembly constructed in accordance with my present invention.
Figure 2:
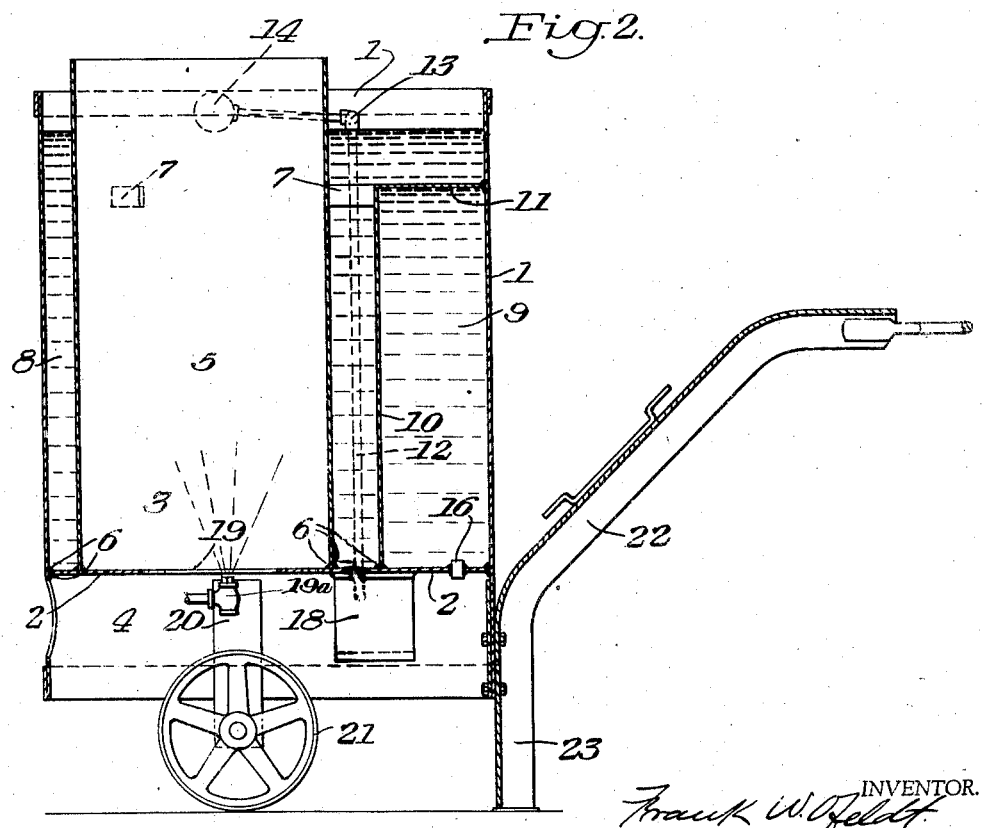
Fig. 2 is a vertical section of the heater tank structure.

Referring to the drawing, 1 represents a tank preferably constructed in cylindrical form and having the elevated floor 2 which forms the upper and lower compartments 3 and 4. The upper compartment 3 of the tank 1 is subdivided into three chambers, the combustion chamber 5, the fluid chamber and the fuel chamber.

The combustion chamber 5 is preferably cylindrical in shape and positioned eccentrically of the tank 1 but in spaced relation with the perimetral wall the latter. The bottom of the combustion chamber 5 rests on the floor 2 and is secured thereto by a fluid-tight, sealed joint, as by welding, as indicated at 6. The combustion chamber may be supported by braces 7 extending inwardly from the perimetral wall of the tank 1. The interior of the tank 1 surrounding the combustion chamber 5 forms the compartment 8 for the storage of the supply of the fluid to be heated.

9 represents a fuel-compartment formed by a vertical partition 10, which forms the cord of an arc of the perimetral wall of the tank 1, by the arcuate portion of the said wall, the floor 2 and the top closure 11. The partition 10 is spaced from the perimetral wall of the combustion chamber 5 and one of the braces 7 may be interposed between the same.

12 represents a liquid supply pipe extending up through a sealed port in the floor 2 and within the fluid compartment 8 to a point adjacent to the top of the latter, and 13 represents a valve on the upper end of said pipe controlled by the float 14 which is operated by the level of the liquid in compartment 8, thus maintaining a constant level of the fluid in said compartment, as indicated.

As illustrated, the top 11 of the fuel compartment 9 is materially below the normal level of the liquid in compartment 8.

Thus at all times a body of this liquid is interposed between the combustion chamber and the fuel compartment, thus preventing significant heat-transference to the fuel which would generate dangerously explosive gases in the fuel compartment.

Further insulation for the fuel tank is provided by the liquid overlying the top of the fuel compartment, thus preventing heat-transference through the air above the body of fluid in the compartment 8.

There is also a conservation of heat energy by surrounding the combustion chamber with the liquid to be heated.

15 represents a throat connecting with the interior of the fuel compartment for filling the same.

16 represents the port connection through the floor 2 for withdrawing fuel from the compartment 9 for the burner. 17 represents a similar port in the bottom of the compartment 8 for the withdrawal of the liquid to be heated.

18 represents a bracket or other support depending from the floor 2 within the compartment 4. Upon this support the fuel and liquid pumps are mounted. The fuel burner, indicated at 19a, is supported by the floor 2 and is centered in an annular opening 19 at the bottom of the combustion chamber 5. Any suitable type of burner may be employed, such, for instance, as is illustrated in my co-pending patent application Serial No. 88,106, filed June 30, 1936. Inasmuch as the structure of the fuel and liquid pumps, the burner and the coil or other heat-transfer means within the combustion chamber, are not per se a part of the subject matter of the present application, the same are not shown. Suitable structures for these purposes are shown and described in my pending patent applications as follows, Serial No. 87,847, filed June 29, 1936; Serial No. 91,405 filed July 18, 1936, and Serial No. 88,106 filed June 30, 1936.

20 represents a frame secured to the lower end of the tank 1 upon which are mounted the traction wheels 21. 22 represents a handle or tongue for conveniently moving the portable assembly from place to place.

The lower portion 23 of the tongue 22 is extended downwardly to form a leg to support the assembly when stationary.

I claim:—

1. In a heater tank assembly, the combination of an outer enclosure tank, a floor in said tank, a combustion chamber mounted on the floor within said tank, a fuel burner associated with the combustion chamber, a fuel compartment formed by a partition and top with the floor and side wall of said tank, said partition spaced from the wall of the combustion chamber, and a compartment formed by the partition and top of the fuel tank, the wall and the floor of the enclosure tank and the wall of the combustion chamber for storing the liquid to be heated.

2. In a heater tank assembly, the combination of an outer enclosure tank, a combustion chamber constructed within said tank, a fuel burner associated with the combustion chamber, a fuel compartment formed by a partition and top wall with the wall of said tank, said fuel compartment being spaced from the combustion chamber, and a compartment formed between the fuel compartment and the combustion chamber for storing the liquid to be heated, and braces passing through the upper part of the liquid compartment for supporting the upper end of the combustion chamber.

FRANK W. OFELDT.